United States Patent [19]
Jaeger

[11] 3,860,613
[45] Jan. 14, 1975

[54] PERFLUORALKYLMONOCARBOXYLIC ACID ESTERS

[75] Inventor: Horst Jaeger, Bettingen, Switzerland

[73] Assignee: Ciba-Geigy Corporation, Basel, Switzerland

[22] Filed: June 26, 1970

[21] Appl. No.: 50,308

[30] Foreign Application Priority Data
July 7, 1969  Switzerland.................. 10350/69

[52] U.S. Cl........ 260/340.7, 260/340.9, 260/348 A, 260/348 C, 260/404.8, 260/404, 260/408, 260/468 J, 260/482 C, 260/486 H, 260/485 F, 260/487, 117/121, 117/124, 117/127, 117/138.8 F, 117/138.8 M, 117/138.8 UA, 117/141, 117/143 R, 117/144, 117/154
[51] Int. Cl...................... C07c 69/62, D06m 13/20
[58] Field of Search.... 260/408, 487, 348 A, 485 F; 3/340.7, 340.9, 468 J

[56] References Cited
UNITED STATES PATENTS
2,856,388  10/1958  Barnhart et al.................. 260/78.4
FOREIGN PATENTS OR APPLICATIONS
1,157,320  7/1969  Great Britain

*Primary Examiner*—Lewis Gotts
*Assistant Examiner*—Diana G. Rivers
*Attorney, Agent, or Firm*—Joseph G. Kolodny; Edward McC. Roberts; Prabodh I. Almaula

[57] ABSTRACT

Saturated perfluoralkylmonocarboxylic acid esters are provided which are derived from cycloaliphatic epoxides. These esters contain at least one perfluoralkyl radical with four to 24 carbon atoms, which is bonded to a carboxyl group, which in turn is bonded in an ester-like manner to a cycloaliphatic radical. This radical in the position to the ester bridge contains a hydroxyl group and is bonded to an optionally etherified or esterified second hydroxyl group. The ether or ester radical is a saturated aliphatic radical which is optionally linked with a cycloaliphatic radical, which in turn may be bonded to a perfluoralkyl radical. The perfluoralkylmonocarboxylic acid esters are used for treating porous or non-porous substrates, preferably for the production of olephobic furnishes above all on fibrous materials, such as textiles and papers.

15 Claims, No Drawings

PERFLUORALKYLMONOCARBOXYLIC ACID ESTERS

The subject of the invention are perfluoralkyl-monocarboxylic acid esters, characterised in that they contain (a) at least one perfluoralkyl radical with four to 24 carbon atoms, which is directly bonded to a carboxyl group which is bonded in an ester-like manner, optionally via a bridge member, to (b) a cycloaliphatic radical which in the position adjacent to the ester bridge is substituted by an optionally etherified or esterified hydroxyl group, this radical in turn being bonded, directly or via a bridge member, to (c) an optionally etherified or esterified second hydroxyl group, with the ether or ester radical representing a saturated aliphatic radical which is optionally linked via further ether or ester bridges to a radical such as (b), which is in turn bonded via an ester bridge to a radical such as (a).

Preferably, these perfluoralkylmonocarboxylic acid esters correspond to the formula (I) 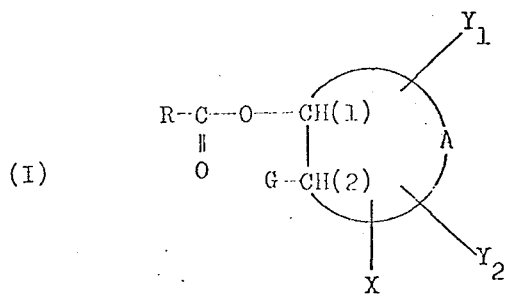

wherein R denotes a perfluoralkyl radical with four to 14 carbon atoms, A and the mutually adjacent carbon atoms (1) and (2) together denote a saturated cycloaliphatic ring or a ring system with five to 10 ring carbon atoms, and $Y_1$ denotes a hydroxyl group or a group of formula $$-CH_2-Z$$

(Ia)

wherein Z denotes a hydroxyl group or an aliphatic or cycloaliphatic radical which is bonded to the —CH$_2$— group by an ether or ester bridge, or wherein $Y_1$ denotes a group of formula (Ib) 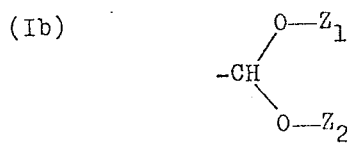

wherein $Z_1$ and $Z_2$ each represent a monovalent aliphatic or cycloaliphatic radical, or together represent a bivalent aliphatic or cycloaliphatic radical, $Y_2$ denotes a hydrogen atom or a group of formula —CH$_2$—Z—, wherein Z has the indicated significance, it also being possible for Z, where it represents an aliphatic radical, to be common to the radicals $Y_1$ and $Y_2$ in a group of formula (Ic) 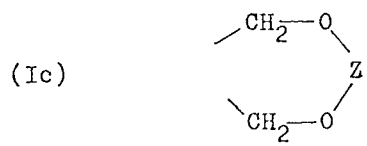

X denotes a hydrogen atom, an alkyl or hydroxyalkyl radical with one to four carbon atoms and G denotes an aliphatic or cycloaliphatic radical which is bonded by an ether or ester bridge to the carbon atom (2), or preferably denotes a hydroxy group.

Compounds of particular interest are here perfluoralkylmonocarboxylic acid esters of formula (II) 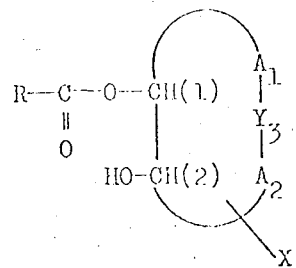

wherein R denotes a perfluoralkyl radical with four to 14 carbon atoms, $A_1$ and $A_2$ together with the mutually adjacent carbon atoms (1) and (2) and the carbon atom (3) in the radical $Y_3$ denote a saturated cycloaliphatic ring with five or six ring carbon atoms or a bicyclic or tricyclic aliphatic ring system with seven to 10 ring carbon atoms, $Y_3$ denotes a radical of formula

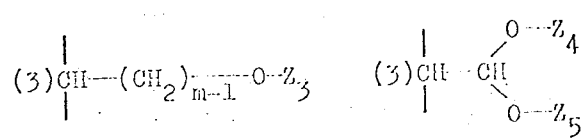

(IIa)     (IIb)     or

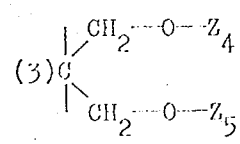

(IIc)

wherein $Z_3$ denotes a hydrogen atom, or an alkyl, hydroxyalkyl or acyl radical with one to 18 carbon atoms which is optionally bonded via a second ether or ester bridge to a radical of formula

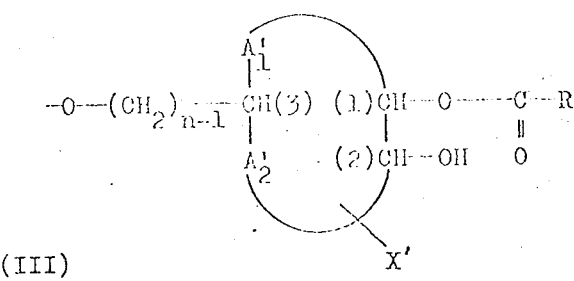

(III)

wherein X', R', $A_1'$ and $A_2'$ have the significance indicated for $X_1$, R, $A_1$ and $A_2$, m and n are 1 or 2, and $Z_3$ also represents a radical of formula

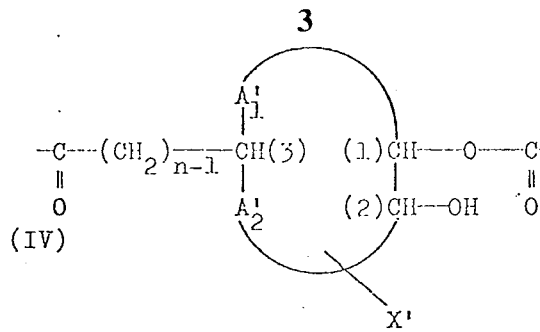

(IV)

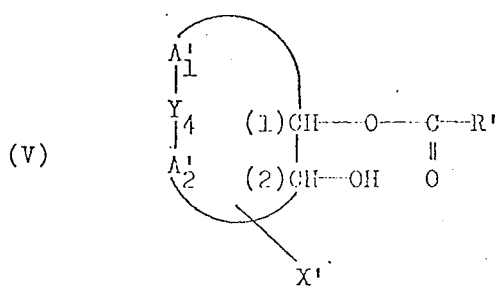

(V)

wherein X', R', $A_1'$, $A_2'$ and n have the indicated significance; $Z_4$ and $Z_5$ each denote a hydrogen atom, or an alkyl, hydroxyalkyl, monoepoxyalkyl or acyl radical with one to 18 carbon atoms or together denote a bivalent alkyl, epoxyalkyl or hydroxyalkyl radical with one to 18 carbon atoms which is optionally bonded via one or two ether bridges or an ester bridge to $Y_4$ in the radical of formula wherein X', R', $A_1'$ and $A_2'$ have the indicated significance, and $Y_4$ represents a radical of formula

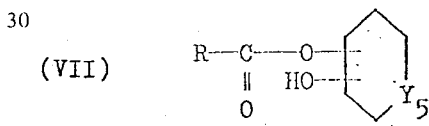

(Va) (Vb)

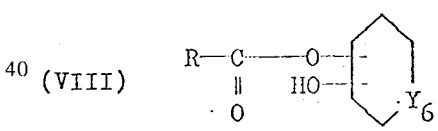

(Vc)

and X denotes a hydrogen atom or an alkyl or hydroxyalkyl radical with 1 to 4 carbon atoms.

Depending on the significance of $Z_3$, $Z_4$ or $Z_5$ in the radical $Y_3$ of formula (II), the perfluoralkylmonocarboxylic acid esters according to the invention are compounds with one or with two perfluoralkylmonocarboxylic acid radicals. However, compounds with only one perfluoralkylmonocarboxylic acid radical are preferred, which correspond to the formula

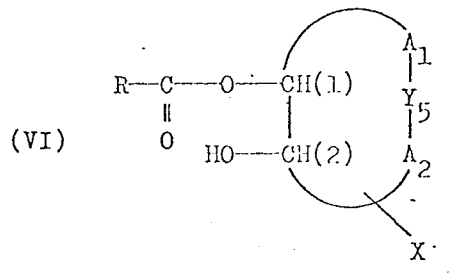

(VI)

wherein X, R, $A_1$ and $A_2$ have the indicated significance, the ring carbon atom (3) is located in the radical $Y_5$, and the latter represents a radical of formula

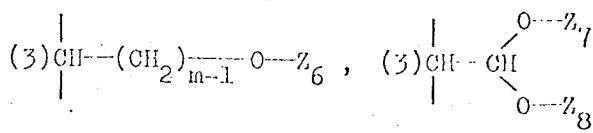

(VIa) (VIb) or

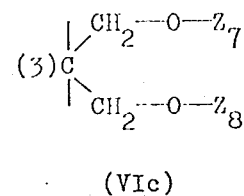

(VIc)

wherein $Z_6$, $Z_7$ and $Z_8$ each represent a hydrogen atom or an alkyl or acyl radical with one to 18 carbon atoms, or wherein $Z_7$ and $Z_8$ together represent a bivalent alkyl or hydroxyalkyl radical with one to 18 carbon atoms, and m is 1 or 2.

Perfluoralkylmonocarboxylic acid esters which are very suitable correspond to the formula (VII)   R—C—O—[ring]—HO—[ring]—$Y_5$
          ‖
          O or especially the formula (VIII)  R—C—O—[ring]—HO—[ring]—$Y_6$
          ‖
          O wherein R and $Y_5$ have the indicated significance, the perfluoralkylmonocarboxylic acid radical and the hydroxyl group are in the 3- and 4-position or 4- and 3-position, to $Y_6$, and $Y_6$ represents a radical of formula

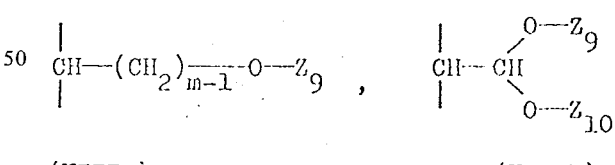

(VIIIa) (VIIIb)

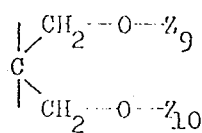

(VIIIc)

wherein $Z_9$ and $Z_{10}$ each denote a hydrogen atom or an alkyl or hydroxyalkyl radical with one to five carbon atoms and m denotes 1 or 2.

Good results are also achieved with perfluoralkylmonocarboxylic acid esters of formula (IX) 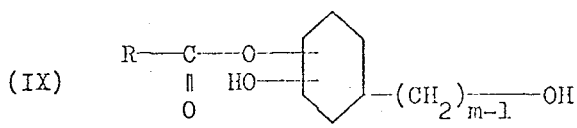

wherein *m* is 1 or 2 and the perfluoralkylmonocarboxylic acid radical and the hydroxyl group are in the 3- and 4-position, or 4- and 3-position, respectively.

A particularly advantageous perfluoralkylmonocarboxylic acid ester corresponds to the formula (Xa) 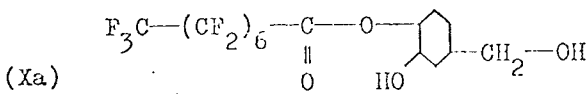

or (Xb) 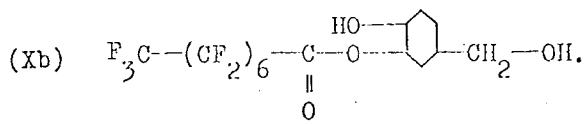

The perfluoralkylmonocarboxylic acid esters according to the invention are mostly isomer mixtures, in that during manufacture by opening of an epoxide ring the esterification with the perfluoralkylmonocarboxylic acid can optionally take place at both adjacent carbon atoms of the epoxide group. Single products are only obtained where the cycloaliphatic ring is symmetrically substituted relative to the epoxide group.

The perfluoralkyl radical of the perfluoralkylmonocarboxylic acid esters according to the invention preferably contains five to 11, or especially seven to nine, carbon atoms. The perfluoralkyl radical can be both branched and unbranched, that is to say iso-perfluoralkyl radicals, for example those of formula (XI) 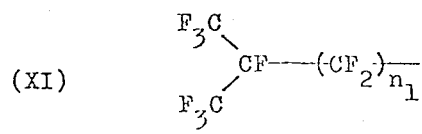

wherein $n_1$ represents an integer having a value of 1 to 11, can also be present. However, n-perfluoralkyl radicals are always preferred. Furthermore, the perfluoralkyl radical can also be a $\omega$-H-perfluoralkyl radical.

The perfluoralkylmonocarboxylic acid esters according to the invention are manufactured by reacting (1) a perfluoralkylmonocarboxylic acid which contains a perfluoralkyl radical with four to 24 carbon atoms which is directly bonded to the carboxyl group, with (2) a cycloaliphatic 1,2-monoepoxide which is bonded directly or via a bridge member to an optionally etherified or esterified second hydroxyl group, with the ether or ester radical representing a saturated aliphatic radical which is optionally linked via further ether or ester bridges to a second cycloaliphatic 1,2-monoepoxide, and optionally further etherifying or esterifying with an aliphatic or cycloaliphatic compound.

Perfluoralkylmonocarboxylic acids employed as starting materials are generally shown in U.S. Pat. Nos. 2,951,051; 3,145,222; and 3,171,861. Cycloaliphatic epoxides generally suitable for the present manufacturing process are disclosed in U.S. Pat. Nos. 2,716,123; 2,750,395; 2,794,029; 2,977,374; 2,999,866; 3,023,174; 3,138,618; 3,210,379; and 3,402,153.

The compounds of formula (I) are obtained if an epoxide of formula (XII) 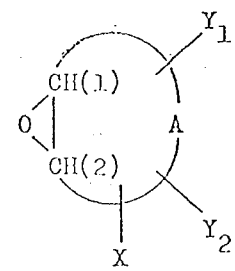

wherein $A_1$, X, $Y_1$ and $Y_2$ have the indicated significance, is used as component (2).

To manufacture compounds of formula (II), epoxides of formula (XIII) 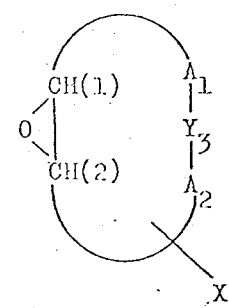

are used, wherein $A_1$, $A_2$, $Y_3$ and X have the indicated significance.

If epoxides of formula (XIV) 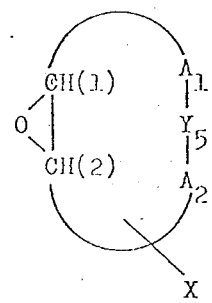

wherein $A_1$, $A_2$, $Y_5$ and X have the indicated significance, are used as component (2), compounds of formula (VI) are obtained.

Esterification of a perfluoralkylmonocarboxylic acid 1. with an epoxide of formulae (XV) 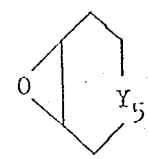 or (XVI) 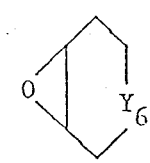

wherein $Y_5$ and $Y_6$ have the indicated significance, yields compounds of formula (VII) or (VIII).

On using an epoxide of formula (XVII) 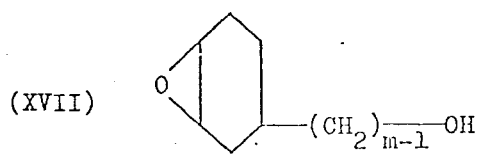
wherein *m* is 1 or 2, compounds of formula (IX) are obtained.
As further epoxides which can be used for the manufacture of the perfluoralkylmonocarboxylic acid esters according to the invention, there may for example be mentioned those of the following formulae:
(XVIIIa) 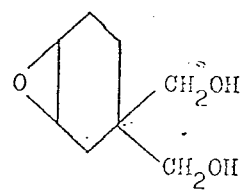
(XVIIIb) 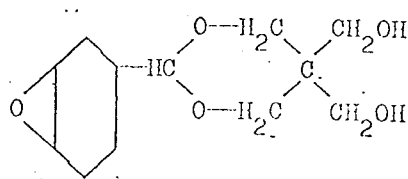
(XVIIIc) 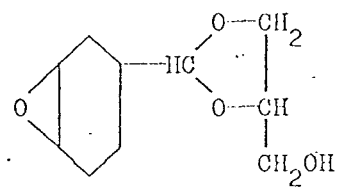
(XVIIId) 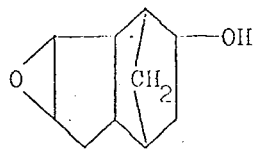
(XVIIIe) 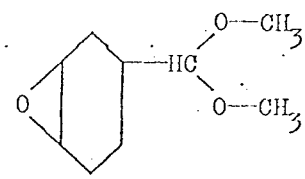
(XVIIIf) 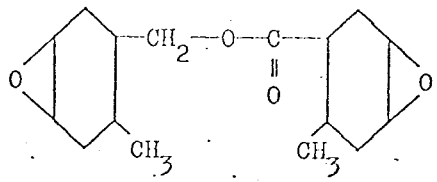
(XVIIIg) 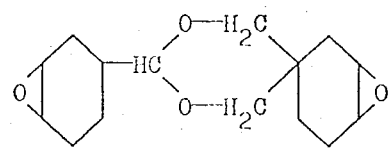
(XVIIIh) 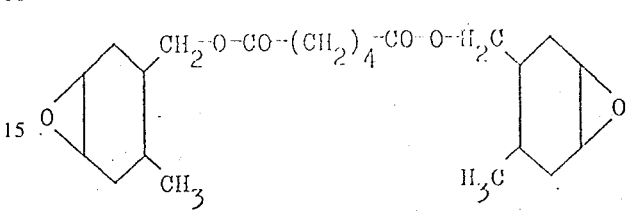
(XVIIIi) 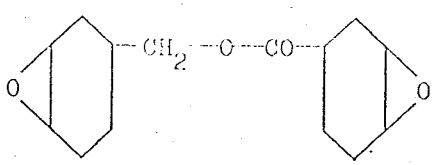
(XVIIIj) 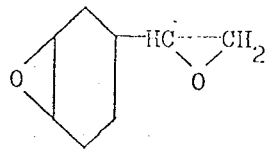
(XVIIIk) 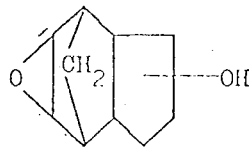
(XVIIIl) 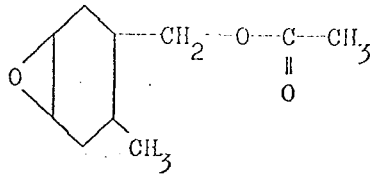
(XVIIIm) 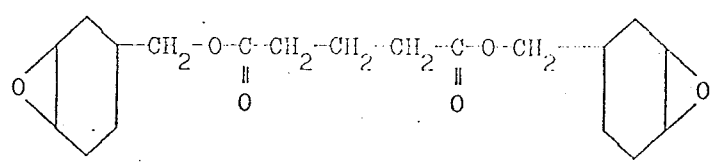

The compound of formula (Xa) or (Xb) is obtained by reaction of (1) perfluorocaprylic acid with (2) 3-epoxytetrahydrobenzyl alcohol.

Perfluoralkylmonocarboxylic acid esters wherein the second hydroxyl group is etherified or esterified, can also be manufactured by first esterifying the hydroxyepoxide with a perfluoralkylmonocarboxylic acid and only subsequently carrying out further reactions at the second hydroxyl group. Compounds of formula (II), wherein $Y_3$ represents a radical of formula

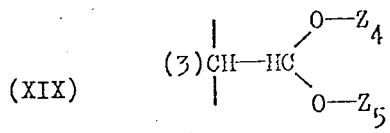

(XIX)

are for example obtained by reaction of the corresponding aldehyde with a polyhydric alcohol, such as for example glycerine or pentaerythritol.

If the process wherein the epoxide is first reacted with a perfluoralkylmonocarboxylic acid and only subsequently etherified or esterified is followed, it is also possible to obtain products which are additionally further esterified or etherified at the hydroxyl group which is in the adjacent position to the perfluoralkylcarboxylic acid ester group.

The perfluoralkylmonocarboxylic acids used for the manufacture of the perfluoro compounds according to the invention preferably contain five to 11 and especially seven to nine, carbon atoms in the perfluoralkyl radical. Compounds of formula (Xa) and (Xb) are obtained by reaction of perfluorocaprylic acid with a compound of formula (XVII), wherein $m = 2$.

The reaction of the components (1) and (2) is preferably carried out in an organic solvent, such as for example acetic acid ethyl ester, and appropriately in the presence of a catalyst, such as for example anhydrous sodium acetate. The reaction is preferably carried out at a temperature of 20° to 70°C, especially at 40° to 60°C.

Depending on the nature of the reagents and of the reaction conditions, the reaction takes 1 to 24 hours; it is however generally complete after 4 to 8 hours.

As a result of the presence of free hydroxyl groups, the perfluoralkylmonocarboxylic acid esters according to the invention react with compounds which contain several functional groups capable of reaction with hydroxyl groups, such as 1,2-epoxide groups, isocyanate groups, acrylic groups, methylol groups, methylol groups etherified with lower alcohols, aldehyde groups, easily hydrolysable ester groups and the like. Such polyfunctional compounds are therefore suitable for use as crosslinking or curing components for the perfluoralkylcarboxylic acid esters, containing hydroxyl groups, according to the invention.

As such crosslinking components there may especially be mentioned: epoxide compounds, particularly polyglycidyl ethers, such as butanediol diglycidyl ether and diglycidyl ether; diisocyanates and polyisocyanates, such as o-, m- and p-phenylenediisocyanate, toluylene-2,4-diisocyanate and 1,5-naphthylenediisocyanate; acrylic compounds such as methylene-bis-acrylamide and symmetrical triacrylylperhydrotriazine; poly(2,3-dihydro-1,4-pyranyl) compounds, such as (2,3-dihydro-1',4'-pyran-2'-yl)-methyl esters; aldehydes such as formaldehyde or glyoxal, and soluble phenolformaldehyde condensation products, such as novolacs or resols. Preferably, aminoplasts which are soluble in water or in organic solvents are used as crosslinking components.

Possible components of this nature are formaldehyde condensation products of urea, thiourea, guanidine, acetylenediurea, and dicyandiamide, and also of amino triazines such as melamine, or of guanamines, such as acetoguaramine, benzoguanamine, tetrahydrobenzoguanamine or formoguanamine, as well as their ethers with alcohols, such as methyl, ethyl, propyl, allyl, butyl, amyl and hexyl alcohol, cyclohexanol, benzyl alcohol, lauryl alcohol, stearyl alcohol, oleyl alcohol or abietyl alcohol. In addition to the ether radicals, the condensation products can also further contain radicals of higher molecular acids, such as for example stearic acid.

Particularly good technical results in the field of textile finishing are obtained on using water-soluble condensation products of formaldehyde and melamine and especially with an esterification or etherification product of hexamethylolmelamine-methyl-ether and stearic acid or stearyl alcohol, as crosslinking components.

The perfluoralkylmonocarboxylic acid esters can also be used as a mixture with polymers not containing fluorine. Very suitable polymers not containing fluorine are here for example the homopolymers of acrylic or methacrylic acid esters, such as poly-ethyl acrylate or copolymers of acrylic or methacrylic acid esters with methylolacrylamide or methylolmethacrylamide.

The perfluoralkylmonocarboxylic acid esters according to the invention can, as a result of their reactive groupings, be used for the treatment of porous and non-porous substrates, preferably for the production of oleophobic finishes on porous and non-porous substrates, with incorporation into the material in question or above all application to its surface being possible. By porous substrates, leather or preferably fibrous materials such as textiles and paper are to be understood, and possible non-porous materials are plastics and above all surfaces of metals and especially glass.

The finishing of the substrates with the perfluoralkylmonocarboxylic acid esters according to the invention can take place in a separate process stage but also in the same process stage as the application of further finishing agents, for example together with known agents for imparting hydrophobic properties such as paraffin emulsions, or solutions or emulsions of fatty acid condensation products, for example with aminoplastic precondensates.

Furthermore, a so-called "soil release" and "antisoiling" effect can be achieved with the perfluoro compounds according to the invention, especially on cotton. Simultaneously with the effect of imparting oleophobic properties, perfluoro compounds containing hydroxyl groups also shown hydrophilic properties. For imparting oleophobic properties, the substrates can be treated both with solutions and with dispersions or emulsions of the perfluoro compounds. The perfluoralkylmonocarboxylic acid esters can for example also be applied to the textile material as a solution with an organic solvent and be fixed by heat to the fabric after evaporation of the solvent.

Textile materials are of particular interest for finishing by means of the perfluoralkylmonocarboxylic acid esters according to the invention. Such materials for example include those of natural or regenerated cellulose, such as cotton, linen or rayon, staple rayon or cellulose acetate. However, textiles of wool, synthetic polyamides, polyesters or polyacrylonitrile can also be used. Mixed woven fabrics or mixed knitted fabrics of cotton-polyester fibres can also advantageously be finished. For this purpose, the textiles can be in the form of filaments, fibres or flocks, but preferably of woven fabrics or knitted fabrics.

Preparations which contain the perfluoro compounds according to the invention can be applied to the substrate in the customary manner which is in itself known. Woven fabrics can for example be impregnated in accordance with the exhaustion process or on a padder which is fed with the preparation at room temperature. The impregnated material is thereafter dried at 60° to 120° C and subsequently optionally further subjected to a heat treatment at above 100°C, for example at 120° to 200°C.

The textiles treated in this way show an oil-repellant effect and where the preparation additionally contains an agent for conferring hydrophobic properties, this oil-repellant effect is coupled with a water-repellant effect.

EXAMPLE 1

27.8 g of 3-epoxytetrahydrobenzyl alcohol together with 41.4 g of perfluorocaprylic acid are dissolved in 100.0 ml of acetic acid ethyl ester at room temperature, with the addition of 2.0 g of anhydrous sodium acetate. A temperature rise to 50°C occurs and the reaction temperature is kept constant at this level. After 6 hours' reaction the epoxide content is 0percent. The solution is concentrated in vacuo at 30°C. The residue is washed with water and yields 67.5 g of a clear yellow-coloured viscous lower phase (= 97.5percent of theory). The structure is confirmed by recording a mass spectrum, in that this shows a molecular weight of 542, which corresponds to a product of formula (X$a$) or (X$b$).

EXAMPLE 2 (X 2.76 g of an epoxide of formula (XVII) ($x = 2$) together with 9.14 g of perfluoralkylcarboxylic acid are dissolved in 50 ml of acetic acid ethyl ester at room temperature, with the addition of 1 g of anhydrous sodium acetate. The perfluoralkylcarboxylic acid used is obtained by saponification of a n-perfluoralkyl iodide mixture which contains $C_{10}$ to $C_{18}$ perfluoralkyl iodides.

A temperature rise to 22°C occurs and the reaction temperature is kept constant at 40°C. After 12 hours' reaction the epoxide content is 0 percent. The solution is concentrated in vacuo at 40°C and yields a white, pasty phase. Weight 10.0 g = 96.92 percent of theory.

The structure is confirmed by recording a mass spectrum, in that this shows a molecular weight of 1,042 to 642, which corresponds to a product of formula

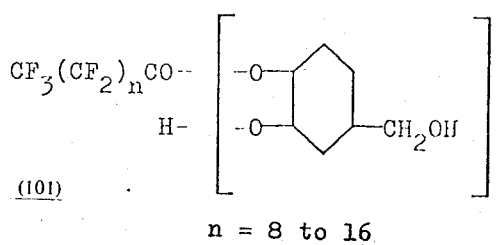

(101)

n = 8 to 16

EXAMPLE 3

34.8 g of epoxide of formula (XVIII$g$) together with 41.4 g of perfluorocaprylic acid are dissolved in 100 ml of acetic acid ethyl ester at room temperature with the addition of 2.0 g of anhydrous sodium acetate. A temperature rise to 32°C occurs. The reaction temperature is kept constant at 30°C and after 12 hours' reaction the epoxide content is 39.8 percent. The solution is concentrated in vacuo at 40°C. The residue is taken up in 200 ml of diethyl ether and washed 3 times with 50 ml of water. The ether phase is dried with $Na_2SO_4$ and concentrated, and yields a yellow, viscous phase. Weight 62.5 g = 92.0 percent of theory.

The structure is confirmed by recording a mass spectrum, in that this shows a molecular weight of 680, which corresponds to a product of formula

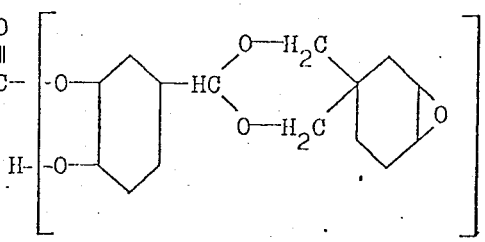

(102)

or

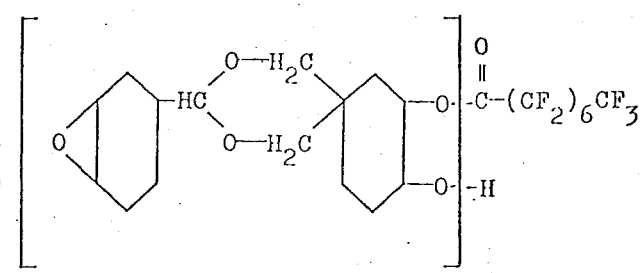

(103)

EXAMPLE 4

34.8 g of an epoxide of formula (XVIII$g$) together with 82.8 g of perfluorocaprylic acid are dissolved in 150 ml of acetic acid ethyl ester at room temperature with the addition of 2 g of anhydrous sodium acetate. A temperature rise to 32°C occurs. The reaction temperature is kept constant at 30°C and after 12 hours' reaction the epoxide content is 0 percent. The solution is concentrated in vacuo at 40°C. The residue is taken up in 200 ml of diethyl ether and washed 3 times with 50 ml of water. The ether phase is dried over $Na_2SO_4$ and concentrated, and yields a yellow, viscous phase. Weight 108.5 g = 99 percent of theory.

The structure is confirmed by recording a mass spectrum, in that this shows a molecular weight of 1.094, which corresponds to a product of formula

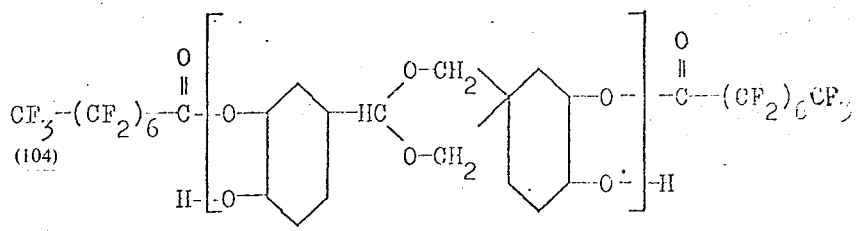

EXAMPLE 5

23.5 g of epoxide of formula (XVIIIh) together with 41.4 g of perfluorocaprylic acid are dissolved in 100 ml of acetic acid ethyl ester at room temperature with the addition of 2.0 g of anhydrous sodium acetate. A temperature rise to 33°C occurs. The reaction temperature is kept constant at 35°C and after 12 hours' the epoxide content is 0 percent. The solution is concentrated in vacuo at 40°C. The residue is taken up in 200 ml of diethyl ether and is washed 3 times with 50 ml of water. The ether phase is dried with $Na_2SO_4$ and concentrated, and yields a yellow, viscous phase.
Weight 58.9 g = 96.3 percent of theory.
The structure is confirmed by recording a mass spectrum, in that this shows a molecular weight of 1,222, which corresponds to a product of formula

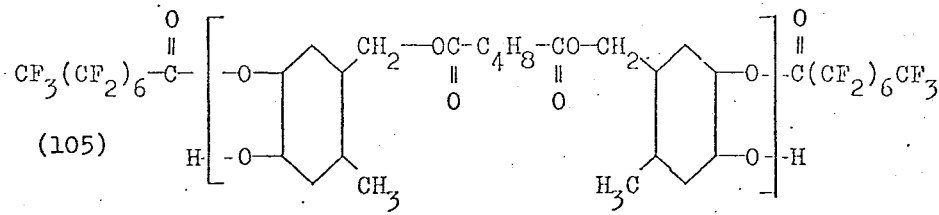

EXAMPLE 6

47 g of epoxide of formula (XVIIIh) together with 41.4 g of perfluorocaprylic acid are dissolved in 100 ml of acetic acid ethyl ester at room temperature with the addition of 2.0 g of anhydrous sodium acetate. A temperature rise to 30°C occurs. The reaction temperature is kept constant at 30°C and after 12 hours' reaction the epoxide content is 56.5 percent. The solution is concentrated in vacuo at 40°C. The residue is taken up in 200 ml of diethyl ether and washed 3 times with 50 ml of water. The ether phase is dried with $Na_2SO_4$ and concentrated, and yields a light yellow, viscous phase.
Weight 72.8 g = 90.1 percent of theory.

The structure is confirmed by recording a mass spectrum, in that this shows a molecular weight of 808, which corresponds to a product of formula

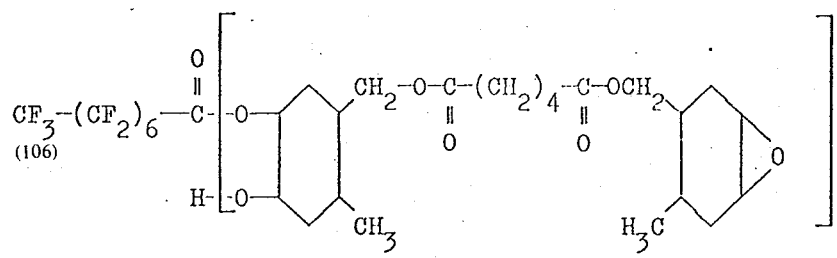

EXAMPLE 7

94 g of epoxide of formula XVIIIi) together with 82.4 g of perfluorocaprylic acid are dissolved in 200 ml of acetic acid ethyl ester at room temperature with the addition of 4 g of anhydrous sodium acetate. A temperature rise to 29°C occurs. The reaction temperature is kept constant at 30°C and after 12 hours' reaction the epoxide content is 56.5 percent. The solution is concentrated in vacuo at 40°C. The residue is taken up in 300 ml of diethyl ether and washed 3 times with 50 ml of water. The ester phase is dried over $Na_2SO_4$ and concentrated and yields a light yellow, viscous phase.
Weight 123.5 g = 94.5 percent of theory.
The structure is confirmed by recording a mass spectrum, in that this shows a molecular weight of 666, which corresponds to an isomer mixture of formula

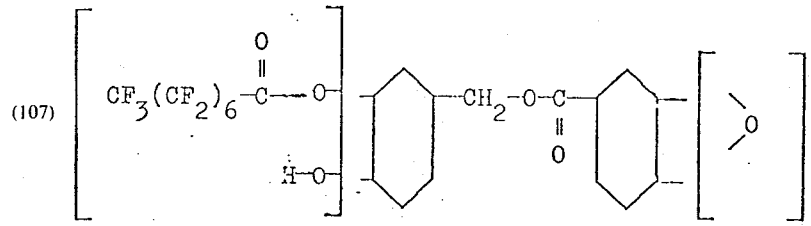

EXAMPLE 8

10.7 g of epoxide of formula XVIIIj) together with 41.4 g of perfluorocaprylic acid are dissolved in 100 nl of acetic acid ethyl ester at room temperature, with the addition of 2.0 g of anhydrous sodium acetate. A temperature rise to 26°C occurs. The reaction temperature is kept constant at 35°C and after 8 hours' reaction the epoxide content is 0 percent. The solution is concentrated in vacuo at 40°C. The residue is taken up in 200 ml of diethyl ether and washed 3 times with 50 ml of water. The ether phase is dried and concentrated and yields a light yellow, viscous phase.

Weight 33.2 g = 68.7 percent of theory. The structure is confirmed by recording a mass spectrum, in that this shows a molecular weight of 968, which corresponds to a product of formula

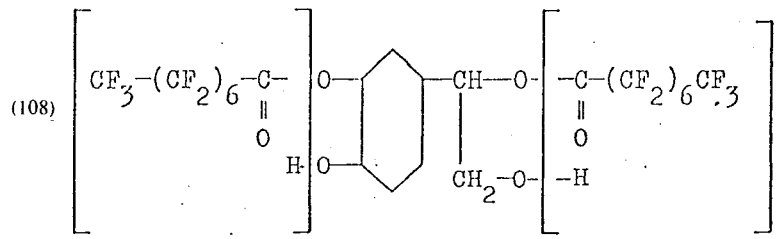

EXAMPLE 9

21.4 g of epoxide of formula XVIII$j$) together with 41.4 g of perfluorocaprylic acid are dissolved in 100 ml of acetic acid ethyl ester at room temperature with the addition of 2.0 g of anhydrous sodium acetate. A temperature rise to 25°C occurs and the reaction temperature is kept constant at 35°C. After 12 hours' reaction the epoxide content is 50.0 percent. The solution is concentrated in vacuo at 40°C. The residue is taken up in 200 ml of diethyl ether and washed 3 times with 50 ml of water, and yields a light yellow phase.

Weight 42.0 g = 79.8 percent of theory.

The structure is confirmed by recording a mass spectrum, in that this shows a molecular weight of 554, which corresponds to a product of formula (110a)

or (110b)

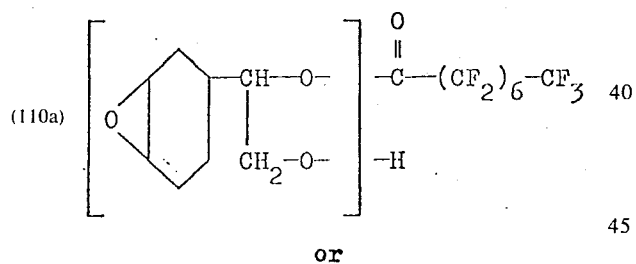

EXAMPLE 10

32.8 g of epoxide of formula (XVIII$c$) together with 41.4 g of perfluorocaprylic acid are dissolved in 100 ml of acetic acid ethyl ester at room temperature with the addition of 2.0 g of anhydrous sodium acetate. A temperature rise to 33°C occurs. The reaction temperature is kept constant at 30°C and after 12 hours's reaction the epoxide content is 0 percent. The solution is concentrated in vacuo at 90°C. The residue is taken up in 200 ml of diethyl ether and washed 3 times with 50 ml of water. The ether phase is dried with $Na_2SO_4$ and concentrated and yields a yellow, viscous phase.

Weight 44.7 g = 72.8 percent of theory.

The structure is confirmed by recording a mass spectrum, in that this shows a molecular weight of 614, which corresponds to a product of formula

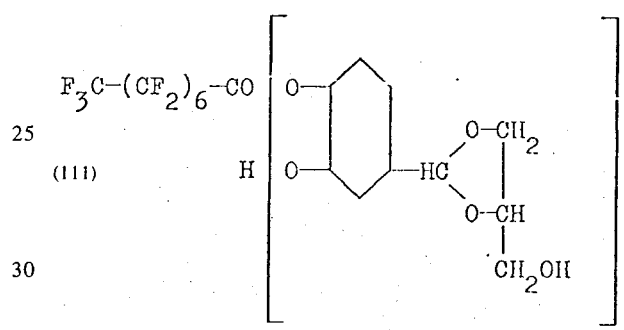

Since the starting material also contains proportions of the 6-ring-acetal, the reaction product also contains proportions of the compound of formula

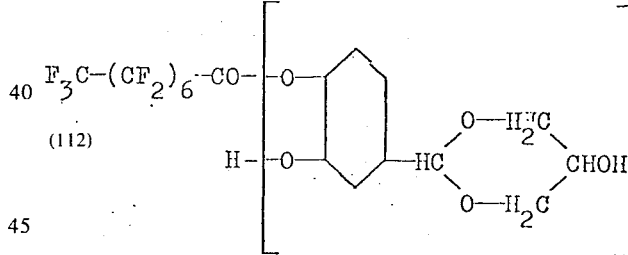

EXAMPLE 11

42.5 g of epoxide of formula (XVIII$k$) together with 41.4 g of perfluorocaprylic acid are dissolved in 100 ml of acetic acid ethyl ethyl ester at room temperature with the addition of 2 g of anhydrous sodium acetate. A temperature rise to 23°C occurs. The reaction temperature is kept constant at 30°C and after 8 hours' reaction the epoxide content is 0 percent. The solution is concentrated in vacuo at 40°C. The residue is taken up in 200 ml of diethyl ether and washed 3 times with 50 ml of water. The ether phase is dried with $Na_2SO_4$ and concentrated, and yields at light brown, viscous phase. Weight 51.6 g = 89.0 percent of theory. The structure is confirmed by recording a mass spectrum, in that this shows a molecular weight of 580, which corresponds to a product of formula

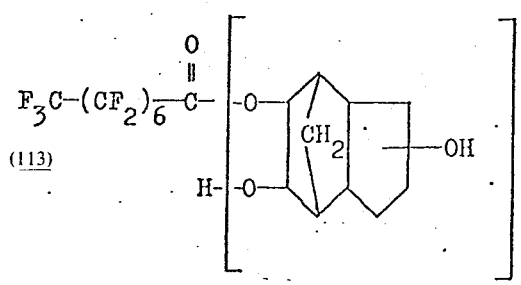

(113)

EXAMPLE 12

37 g of epoxide of formula (XVIIIa) together with 9.7 g of perfluorocaprylic acid are dissolved in 280 ml of acetic acid ethyl ester at room temperature with the addtion of 1.0 g of anhydrous sodium acetate. A temperature rise to 22°C occurs. The reaction temperature is kept constant at 30°C and after 8 hours' reaction the epoxide content is 0 percent. The solution is concentrated in vacuo at 40°C. The residue is taken up in 100 ml of diethyl ether and washed 3 times with 50 ml of water. The ether phase is dried over $Na_2SO_4$ and concentrated and yields a crystalline phase.
Weight 40 g = 85.5 percent of theory.
The structure is confirmed by recording a mass spectrum, in that this shows a molecular weight of 572, which corresponds to a product of formula

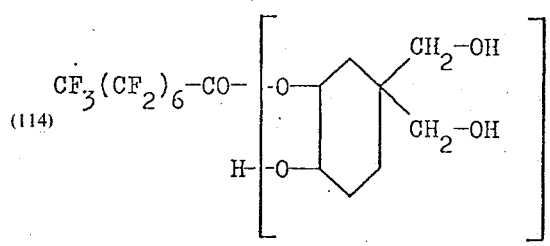

(114)

EXAMPLE 13

31.4 g of epoxide of formula

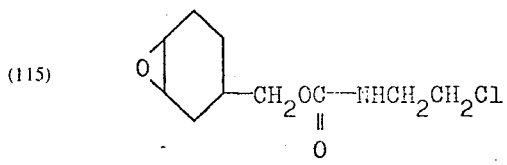

(115)

together with 20.7 g of perfluorocaprylic acid are dissolved in 100 ml of acetic acid ethyl ester at room temperature with the addition of 1 g of anhydrous sodium acetate.

A temperature rise to 27°C occurs and the reaction temperature is kept constant at 30°C. After 10 hours' reaction the epoxide content is 0 percent. The solution is concentrated in vacuo at 30°C. The residue is taken up in 100 ml of diethyl ether and washed 3 times with 20 ml of water, dried with sodium sulphate and concentrated, and yields a light yellow, pasty phase. Weight 36 g = 70.03 percent.

The structure is confirmed by recording a mass spectrum, in that this shows a molecular weight of 647, which corresponds to a product of formula

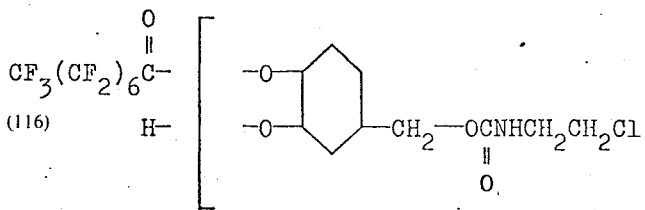

(116)

EXAMPLE 14

6.4 g of 3-epoxytetrahydrobenzyl alcohol together with 27.5 g of ω-H-fluorodecylcarboxylic acid are dissolved in 100 ml of acetic acid ethyl ester at room temperature with the addition of 1.0 g of anhydrous sodium acetate.

A temperature rise to 23°C occurs and the reaction temperature is kept constant at 30°C. After 7 hours' reaction the epoxide content is 0 percent. The solution is concentrated in vacuo at 30°C. The residue is taken up in 100 ml of diethyl ether and washed 3 times with 20 ml of water, and yields a viscous, yellow phase. Weight 29.2 g = 86.7 percent of theory.

The structure is confirmed by recording a mass spectrum, in that this shows a molecular weight of 674, which corresponds to a product of formula

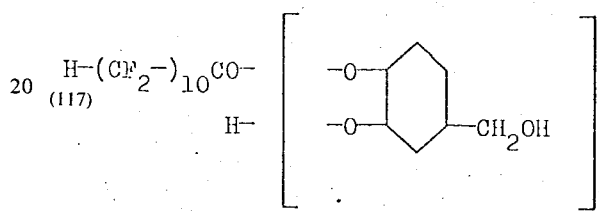

(117)

EXAMPLE 15

6.4 g of epoxide of formula (XVII) ($m = 2$) together with 20.7 g of perfluor-2-ethyl-hexyl acid are dissolved in 100 ml of acetic acid ethyl ester at room temperature with the addition of 1.0 g of anhydrous sodium acetate.

A temperature rise to 29°C occurs and the reaction temperature is kept constant at 30°C. After 5 hours' reaction the epoxide content is 0 percent. The solution is concentrated in vacuo at 40°C. The residue is taken up in 100 ml of diethyl ether, washed 3 times with 20 ml of water and dried with sodium sulphate, and yields a yellow, viscous phase. Weight 19.0 g = 70.11 percent of theory.

The structure is confirmed by recording a mass spectrum, in that this shows a molecular weight of 542, which corresponds to a product of formula

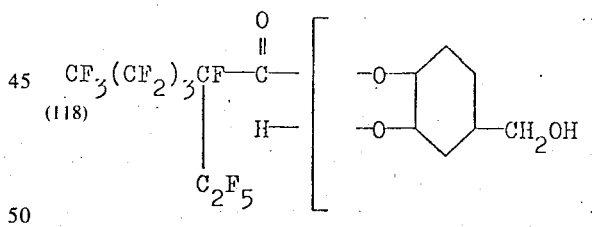

(118)

EXAMPLE 16

6.4 g of epoxide of formula (XVII) ($m = 2$) together with 13.2 g of perfluorovaleric acid are dissolved in 50 ml of acetic acid ethyl ester at room temperature with the addition of 0.5 g of anhydrous sodium acetate.

A temperature rise to 32°C occurs and the reaction temperature is kept constant at 30°c. After 4 hours' reaction the epoxide content is 0 percent. The solution is concentrated in vacuo at 40°C. The residue is taken up in 50 ml of diethyl ether, washed 3 times with 10 ml of water and dried with sodium sulphate, and yields a colourless phase. Weight 12.1 g = 61.73 percent of theory.

The structure is confirmed by recording a mass spectrum, in that this shows a molecular weight of 392, which corresponds to a product of formula

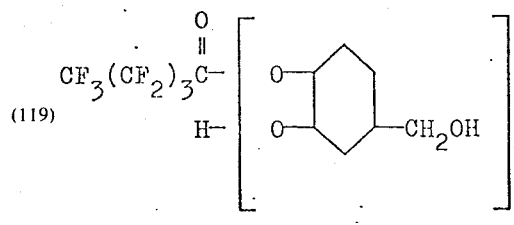
(119)

| Substrate | Rating | |
|---|---|---|
| | as such | after 1 x trichlorethylene |
| Cotton | 150 | 100 |
| Polyamide | 150 | 110 |
| Polyester | 150 | 100 |
| Cotton/polyester | 150 | 100 |
| Paper | 150 | — |

EXAMPLE 18

The following liquors are manufactured from the end products according to Examples 3 to 11:

| Constituents | Liquors | | | | | | | | | | | | |
|---|---|---|---|---|---|---|---|---|---|---|---|---|---|
| | I | II | III | IV | V | VI | VII | VIII | IX | X | XI | XII | XIII |
| g of product from | | | | | | | | | | | | | |
| Example 3 | 2 | 1 | | | | | | | | | | | |
| Example 4 | | | 2 | | | | | | | | | | |
| Example 5 | | | | 2 | | | | | | | | | |
| Example 6 | | | | | 2 | 1 | | | | | | | |
| Example 7 | | | | | | | 2 | 1 | | | | | |
| Example 8 | | | | | | | | | 2 | | | | |
| Example 9 | | | | | | | | | | 2 | 1 | | |
| Example 10 | | | | | | | | | | | | 2 | |
| Example 11 | | | | | | | | | | | | | 2 |
| ml of ethyl acetate | 10 | 10 | 10 | 10 | 10 | 10 | 10 | 10 | 10 | 10 | 10 | 10 | 10 |
| g of citric acid | 0.2 | 0.2 | 0.2 | 0.2 | 0.2 | 0.2 | 0.2 | 0.2 | 0.2 | 0.2 | 0.2 | 0.2 | 0.2 |
| g of MgCl$_2$ | 0.2 | 0.2 | 0.2 | 0.2 | 0.2 | 0.2 | 0.2 | 0.2 | 0.2 | 0.2 | 0.2 | 0.2 | 0.2 |
| g of water | — | — | 0.5 | 0.5 | 0.5 | 0.5 | 0.5 | 0.5 | 0.5 | 0.5 | 0.5 | 0.5 | 0.5 |
| g of hexamethylol-melamine-penta-methyl-ether | — | 1 | — | — | — | 1 | — | 1 | — | — | 1 | — | — |

EXAMPLE 17

2 g of the end product according to Example 1 are dissolved in 10 ml of acetic acid ethyl ester.

Woven pieces of fabric made of cotton, cotton-polyester, synthetic polyamide and polyester are successively dipped into this solution and thus impregnated with the perfluoro compound. A piece of filter paper is also impregnated in this waay. The woven fabric samples and paper samples are thereafter dried for 30 minutes at 100°C.

The assessment of the oil-repellent effect is carried out in accordance with the so-called "3 M oil repellency test" (Crajeck, Peterson, Textile Research Journal 32, 320 to 331 (1960)) with heptane-Nujol mixtures. In the assessment, 150 denotes the best achievable rating. The individual samples are assessed immediately after drying, that is to say as they are, and after washing in boiling trichlorethylene for 5 minutes. The results are summarised in the table which follows.

Pieces of woven fabric made of cotton, cottonpolyester, synthetic polyamide, polyester and wool gaberdine are successively dipped into these liquors and thus impregnated with the perfluoro compounds. In part, a piece of filter paper is also impregnated in this way. The woven fabric and paper samples are thereafter dried for 10 minutes at 130°C in vacuo. A glass plate is in part also coated and dried in the same way. The oil-repellent effect is assessed as indicated in Example 17. Additionally, the oleophobic character is also tested after one SNV-4 wash. SNV-4 wash: washed for 30 minutes at 95°C in a wash liquor which contains 5 g of soap and 2 g of anhydrous sodium carbonate and 10 steel balls per litre, using a liquor ratio of 1:50.

The results are summarised in the table which follows. In the table the symbols denote:

| | |
|---|---|
| a | assessment as such |
| b | assessment after wash in trichlorethylene |
| c | assessment after 1 x SNV-4 wash |
| C | cotton |
| C/PE | cotton/polyester |
| PE | polyester |
| PA | polyamide |
| W | wool gaberdine |
| P | paper |
| G | glass |
| Ol | oleophobic |
| ho | hydrophobic |
| hy | hydrophilic |

| | | treated with liquor | | | | | | | | | | | | |
|---|---|---|---|---|---|---|---|---|---|---|---|---|---|---|
| | | 1 | II | III | IV | V | VI | VII | VIII | IX | X | XI | XII | XIII |
| C | a | 1 | 50 | 100 | 50 | 50 | 0 | 100 | 70 | 60 | 60 | 70 | 80 | |
| C | b | 100 | 50 | 100 | 50 | 50 | 50 | 80 | 60 | 120 | 110 | 80 | 70 | 90 |
| C | c | 50 | 50 | 50 | 50 | 50 | 50 | 50 | 50 | 50 | 50 | 50 | 60 | 50 |
| C/PE | a | 100 | 60 | 110 | 50 | 50 | 50 | 100 | | | | | | |
| G | a | 80 | 90 | 50 | 80 | 100 | | | | | | | | |
| | b | 100 | 70 | 100 | 60 | 70 | 50 | 100 | 50 | 120 | 110 | 100 80 | 80 | |
| | c | 50 | 50 | 50 | 50 | 50 | 50 | 50 | 50 | 50 | 60 | 70 | 50 | |
| PE | a | 100 | 80 | 120 | 50 | 60 | 50 | 100 | 80 | 60 | 110 | 70 | 100 | 100 |
| | b | 100 | 60 | 100 | 60 | 70 | 50 | 90 | 50 | 130 | 110 | 100 | 90 | 90 |
| | c | 50 | 50 | 100 | 50 | 50 | 50 | 50 | 50 | 50 | 50 | 50 | 90 | 50 |

—Continued

| | | I | II | III | IV | V | VI | treated with liquor VII | VIII | IX | X | XI | XII | XIII |
|---|---|---|---|---|---|---|---|---|---|---|---|---|---|---|
| PA | a | 100 | 100 | 130 | 50 | 70 | 70 | 120 | 80 | 90 | 110 | 110 | 100 | 110 |
|  | b | 100 | 90 | 110 | 60 | 70 | 50 | 110 | 60 | 130 | 130 | 100 | 90 | 110 |
|  | c | 50 | 50 | 50 | 50 | 50 | 50 | 50 | 50 | 50 | 50 | 50 | 80 | 50 |
| W | a | 50 | 50 | 50 | 50 | 50 | 50 | 50 | 50 | 50 | 60 | 50 | 50 | 50 |
|  | b | 50 | 60 | 80 | 50 | 50 | 50 | 50 | 50 | 110 | 110 | 90 | 50 | 70 |
|  | c | 50 | 50 | 50 | 50 | 50 | 50 | 50 | 50 | 50 | 50 | 50 | 50 | 50 |
| P | a | — | — | — | — | — | — | — | — | — | — | — | — | — |
| G | a | 110 | — | 120 | 70 | 60 | — | 120 | — | 140 | 110 | — | 100 | 100 |

The finishes are:

| | I | II | III | IV | V | VI | VII | VIII | IX | X | XI | XII | XIII |
|---|---|---|---|---|---|---|---|---|---|---|---|---|---|
| ol | X | X | X | X | X | X | X | X | X | X | X | X | X |
| ho | X | X | | | | X | X | X | | | X | | |
| hy | | | X | X | X | | | | X | X | | X | X |

EXAMPLE 19

The following liquors are manufactured from the end products according to Example 1, 2 and 12 to 14:

| Constituents | Liquors | | | | | | | | | |
|---|---|---|---|---|---|---|---|---|---|---|
| | XIV | XV | XVI | XVII | XVIII | XIX | XX | XXI | XXII | XXIII |
| g of product from | | | | | | | | | | |
| Example 12 | 2 | 2 | | | | | | | | |
| Example 2 | | | 1 | 1 | | | | | | |
| Example 13 | | | | | 1 | 1 | | | | |
| Example 14 | | | | | | | 2 | 2 | | |
| Example 1 | | | | | | | | | 2 | 2 |
| ml of ethyl acetate | 10 | 10 | 10 | 10 | 10 | 10 | 10 | 10 | 10 | 10 |
| g of citric acid | 0.2 | 0.2 | 0.2 | 0.2 | 0.2 | 0.2 | 0.2 | 0.2 | 0.2 | 0.2 |
| g of MgCl$_2$ | 0.2 | 0.2 | 0.2 | 0.2 | 0.2 | 0.2 | 0.2 | 0.2 | 0.2 | 0.2 |
| g of water | 0.5 | 0.5 | 0.5 | 0.5 | 0.5 | 0.5 | 0.5 | 0.5 | 0.5 | 0.5 |
| g of hexamethyl-melamine-penta-methyl-ether | — | 1 | — | 1 | — | 1 | — | 2 | — | 2 |

Pieces of woven fabric made of cotton, cotton-polyester, synthetic polyamide, polyester and wool gaberdine are successively dipped into these liquors and thus impregnated with the perfluoro compounds. The further procedure is carried out as described in Example 18.

EXAMPLE 20

2 g of the end product according to Example 15 and 16 are respectively dissolved in 10 ml of acetone. 1 g of hexamethylolmelamine-pentamethyl-ether, 0.2 g of MgCl$_2$, 0.2 g of citric acid and 10 ml of a 1:1 mixture of acetone:water are additionally weighed out into this solution. Solution A contains the end product from Example 19, and solution B that from Example 20.

Pieces of woven fabric made of cotton, cottonpolyester, synthetic polyamide, polyester and wool gaberdine are successively dipped into these liquors and thus impregnated with the perfluoro compound.

The woven fabrics are thereafter dried for 5 minutes at 130°C.

The oil-repellent effect is assessed as indicated in Example 18. The results are summarised in the table which follows.

| Substrate | as such | | Rating after 1 × trichlorethylene | |
|---|---|---|---|---|
| | A | B | A | B |
| Cotton | 60 | 50 | 50 | 50 |
| Cotton/Polyester | 70 | 50 | 50 | 50 |
| Polyester | 60 | 50 | 50 | 50 |
| Polyamide | 60 | 50 | 50 | 50 |
| Wool gaberdine | 50 | 50 | 50 | 50 |

| Substrate | Rating achieved with liquors | | | | | | | | | |
|---|---|---|---|---|---|---|---|---|---|---|
| | XIV | XV | XVI | XVII | XVIII | XIX | XX | XXI | XXII | XXIII |
| Cotton | | | | | | | | | | |
| a | 50 | 50 | 120 | 100 | 50 | 140 | 50 | 50 | 120 | 120 |
| b | 50 | 50 | 80 | 80 | 50 | 50 | 50 | 50 | 70 | 80 |
| c | 50 | 50 | 50 | 50 | 50 | 50 | 50 | 50 | 50 | 50 |
| Cotton/Polyester | | | | | | | | | | |
| a | 50 | 50 | 120 | 120 | 120 | 90 | 70 | 50 | 110 | 110 |
| b | 50 | 50 | 80 | 80 | 70 | 50 | 50 | 50 | 90 | 50 |
| c | 50 | 50 | 50 | 50 | 50 | 50 | 50 | 50 | 50 | 50 |
| Polyester | | | | | | | | | | |
| a | 50 | 50 | 130 | 80 | 110 | 70 | 50 | 50 | 110 | 100 |
| b | 50 | 50 | 90 | 50 | 50 | 50 | 50 | 50 | 80 | 50 |
| c | 50 | 50 | 50 | 50 | 50 | 50 | 50 | 50 | 50 | 50 |
| Polyamide | | | | | | | | | | |
| a | 50 | 50 | 130 | 120 | 110 | 50 | 80 | 50 | 100 | 100 |
| b | 50 | 50 | 50 | 100 | 80 | 50 | 50 | 50 | 50 | 50 |
| c | 50 | 50 | 50 | 50 | 50 | 50 | 50 | 50 | 50 | 50 |
| Wool gaberdine | | | | | | | | | | |
| a | 50 | 50 | 130 | 60 | 50 | 50 | 50 | 50 | 50 | 50 |
| b | 50 | 50 | 50 | 50 | 50 | 50 | 50 | 50 | 50 | 50 |
| c | 50 | 50 | 50 | 50 | 50 | 50 | 50 | 50 | 50 | 50 |

EXAMPLE 21

1 g of the end product according to Example 1 is dissolved in 2.5 ml of a 1:4 mixture of n-butanol:acetone, 0.5 g of a butadiene-styrene 60:40 block polymer, dissolved in 2 ml of a 1:4 mixture of n-butanol:acetone, 4.44 g of a 30 percent solution of polyoctyl methacrylate in a 1:4 mixture of n-butanol: acetone and 100 mg of citric acid are additionally weighed out into this solution.

Pieces of woven fabric made of cotton, cottonpolyester, synthetic polyamide, polyester and wool gaberdine are successively dipped into this liquor and thus impregnated with the perfluoro compound.

The woven fabric samples are thereafter dried for 5 minutes at 140°C.

The oil-repellent effect is assessed as indicated in Example 18.

| Substrate | Rating | | | | The finish is: |
|---|---|---|---|---|---|
| | 1 | 2 | 3 | 4 | |
| Cotton | | | | | |
| a | 100 | — | — | — | |
| b | 100 | 80 | 80 | 50 | ho |
| c | 80 | 100 | 90 | 50 | hy |
| Cotton/ / Polyester | | | | | |
| a | 100 | — | — | — | |
| b | 100 | 80 | 80 | 50 | ho |
| c | 110 | 130 | 120 | 80 | ho |
| Polyester | | | | | |
| a | 100 | — | — | — | |
| b | 90 | 70 | 70 | 50 | ho |
| c | 110 | 80 | 90 | 50 | hy |
| Polyamide | | | | | |
| a | 100 | — | — | — | |
| b | 100 | 60 | 70 | 50 | ho |
| c | 100 | 80 | 80 | 50 | ho |
| Wool gaberdine | | | | | |
| a | 100 | — | — | — | |
| b | 100 | 70 | 70 | 50 | ho |
| c | 100 | 100 | 80 | 50 | ho |

EXAMPLE 22

The following liquor is manufactured from the end product of Example 1: 91 g/l of the end product according to Example 1, dissolved in 410 ml of a 4:1 mixture of acetone: n-butanol, 335 g of a copolymer of octyl methacrylate (96%) and methylolacrylamide-methyl-ether (4 percent) (solids content 30%) in a 4:1 acetone: butanol mixture, and 48 g of butadienestyrene block polymer (6:4) dissolved in 116 ml of petroleum ether ($C_{5-7}$).

The liquor is a homogeneous, clear solution. Before application, 1 g of citric acid is weighed out and added.

Cotton is padded in the above solution and cured for 4½ minutes at 160°C.

The following values are found according to the 3M test:

| | Rating |
|---|---|
| as such | 70 |
| 1 × SNV - 1$^{(x)}$ | 70 |
| 1 × trichlorethylene | 100 |

(x) SNV-1 M-wash: machine wash for 30 minutes at 40°C in a bath containing 5 g/l of soap.

I claim:

1. A perfluoralkylmonocarboxylic acid ester corresponding to the formula

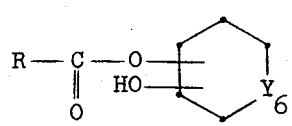

wherein R is a perfluoralkyl radical with four to 14 carbon atoms, the perfluoralkylmonocarboxylic acid radical and the hydroxyl group are in the 3-4-position, or 4- and 3-position, to $Y_6$, and $Y_6$ represents a radical of formula

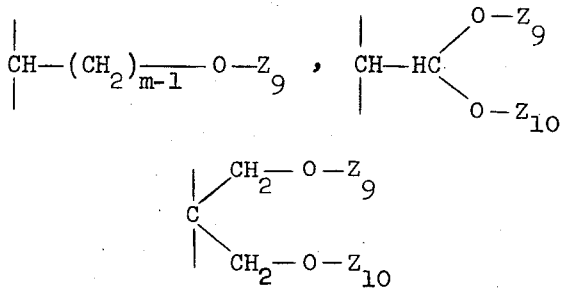

wherein $Z_9$ and $Z_{10}$ each denote a hydrogen atom or an alkyl or hydroxyalkyl radical with one to five carbon atoms, and $m$ denotes 1 or 2.

2. A perfluoralkylmonocarboxylic acid ester according to claim 1 characterized in that it corresponds to the formula

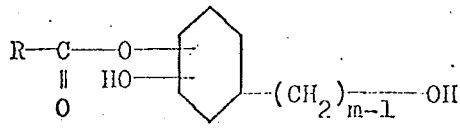

wherein $m$ is 1 or 2 and the perfluoralkylmonocarboxylic acid radical and the hydroxyl group are in the 3- and 4-position or 4- and 3-position, respectively.

3. A perfluoralkylmonocarboxylic acid ester according to claim 1 characterized in that the perfluoralkyl radical contains five 11 carbon atoms.

4. A perfluoralkylmonocarboxylic acid ester according to claim 1 characterized in that the perfluoralkyl radical contains seven to nine carbon atoms.

5. A perfluoralkylmonocarboxylic acid ester according to claim 1 characterized in that it corresponds to the formula

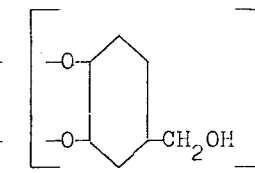

6. A perfluoralkylmonocarboxylic acid ester characterized in that it corresponds to the formula

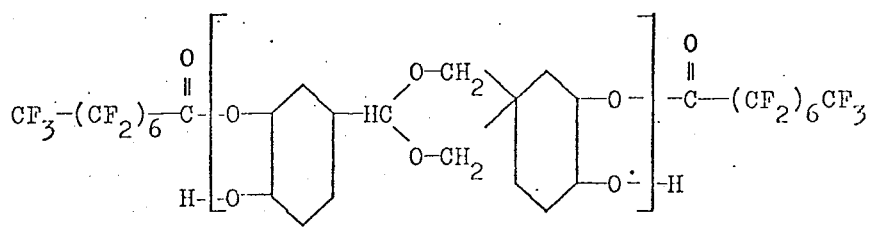

7. A perfluoralkylmonocarboxylic acid ester characterized in that it corresponds to the formula

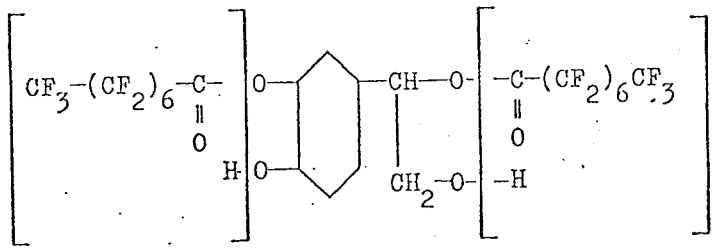

8. A perfluoralkylmonocarboxylic acid ester characterized in that it corresponds to the formula

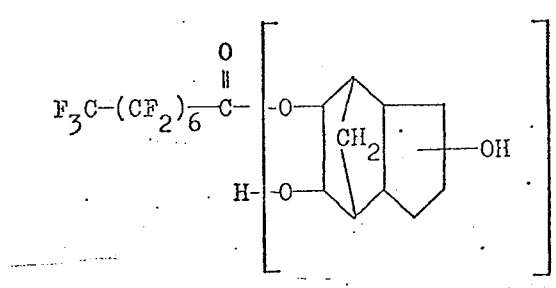

9. A perfluoralkylmonocarboxylic acid ester, characterized in that it corresponds to the formula 10. A perfluoralkylmonocarboxylic acid ester, characterized in that it corresponds to the formula

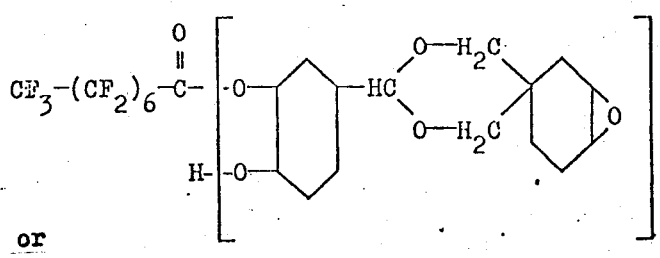

or

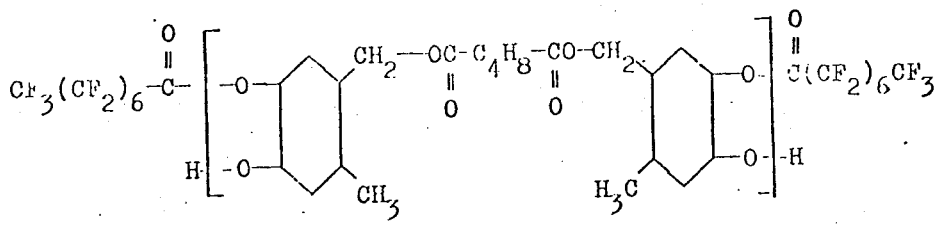

11. A perfluoralkylmonocarboxylic acid ester characterized in that it corresponds to the formula

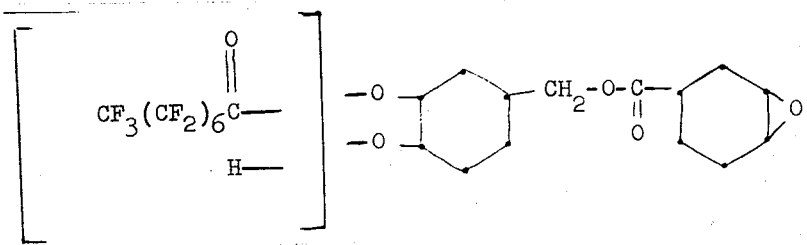

12. A perfluoralkylmonocarboxylic acid ester characterized in that it corresponds to the formula

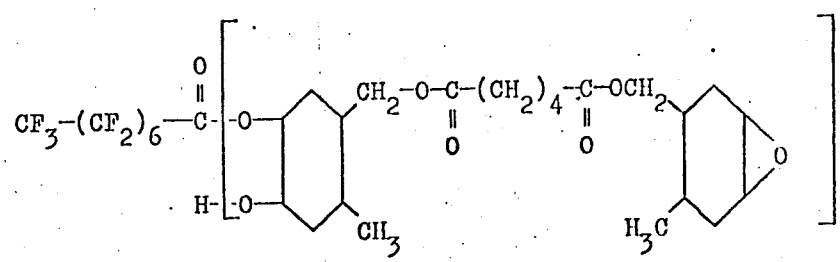

13. A perfluoralkylmonocarboxylic acid ester characterized in that it corresponds to the formula
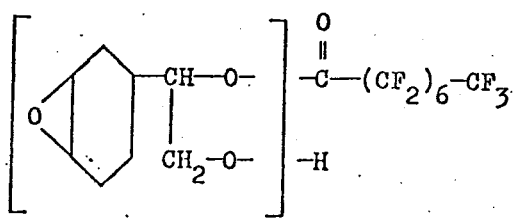
or
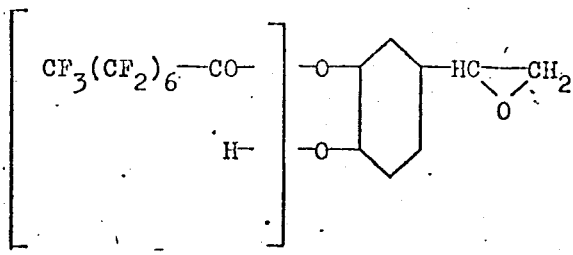
14. A perfluoralkylmonocarboxylic acid ester characterized in that it corresponds to the formula
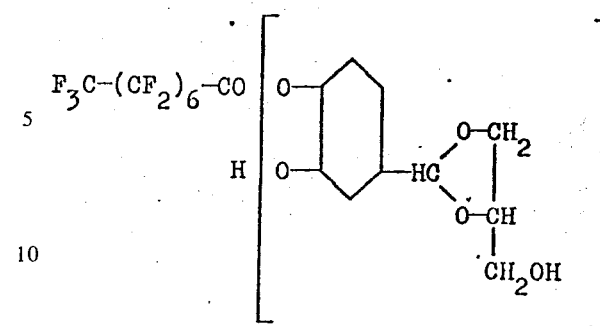
15. A perfluoralkylmonocarboxylic acid ester characterized in that it corresponds to the formula
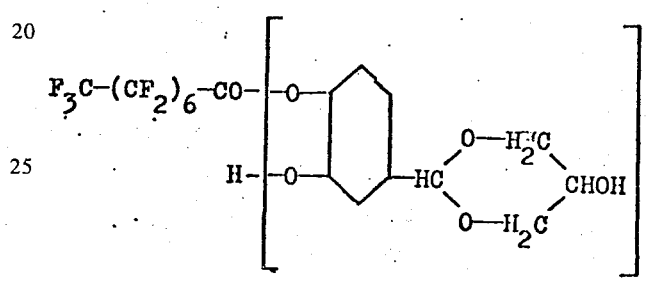
* * * * *

UNITED STATES PATENT OFFICE
CERTIFICATE OF CORRECTION

Patent No. 3,860,613  Dated January 14, 1975

Inventor(s) Horst Jaeger

It is certified that error appears in the above-identified patent and that said Letters Patent are hereby corrected as shown below:

Top page under "Assignee:" delete "CIBA-GEIGY CORPORATION"

should read: -- CIBA-GEIGY AG --

Signed and sealed this 1st day of July 1975.

(SEAL)
Attest:

RUTH C. MASON
Attesting Officer

C. MARSHALL DANN
Commissioner of Patents
and Trademarks